United States Patent [19]

Stemmler et al.

[11] 3,936,312
[45] Feb. 3, 1976

[54] COMPOSITION FOR THE PREPARATION OF COATINGS ON MEAT AND SAUSAGE GOODS

[76] Inventors: Mathias Stemmler; Heinz Stemmler, both of Konrad Adenauer Ufer 35, 5000 Cologne 1, Germany

[22] Filed: May 3, 1974

[21] Appl. No.: 466,897

[30] Foreign Application Priority Data

May 17, 1973  Germany.............................. 2324936
Mar. 15, 1974  Germany.............................. 2412426

[52] U.S. Cl. ................. 106/171; 106/180; 426/611; 426/302; 426/608
[51] Int. Cl.² ............................................ C08L 1/08
[58] Field of Search ............ 106/171, 180; 426/194, 426/362, 302

[56] References Cited

UNITED STATES PATENTS

| | | | |
|---|---|---|---|
| 2,745,749 | 5/1956 | Feuge ................................. | 426/194 |
| 3,000,748 | 9/1961 | Clark ................................... | 117/166 |
| 3,471,304 | 10/1964 | Hamdy................................ | 106/171 |
| 3,779,783 | 12/1973 | Bunger................................ | 106/180 |
| 3,818,947 | 6/1974 | Rose ................................... | 117/167 |

*Primary Examiner*—Theodore Morris
*Attorney, Agent, or Firm*—Burns, Doane, Swecker & Mathis

[57] ABSTRACT

Meat and sausage goods are preserved by applying a coating composition containing a high viscosity cellulose propionate and fully acetylated monoglyceride having a high iodine number, dissolved in a volatile organic solvent.

19 Claims, No Drawings

COMPOSITION FOR THE PREPARATION OF COATINGS ON MEAT AND SAUSAGE GOODS

This invention relates to an agent for the preparation of coatings on meat and sausage goods which contains acetylated monoglyceride and cellulose propionate.

From the German Specification (Auslegeschrift) 1,178,539 a solvent-free protective agent is known, in particular for foodstuffs, on the basis of acetyl glycerides with the addition of cellulose esters. As acetyl glycerides di-or tri-substituted products are suggested, for example 2, 3 diacetyl mono oleic acid glyceride. As preferred cellulose esters those of the cellulose acetobutyrate type are mentioned; the butyric acid residue may be replaced for example by the propionic acid residue. In respect of the degree of polymerization of these cellulose esters it is emphasized, that cellulose esters with viscosities of at least 0.25 to about 35 seconds are used; for cellulose esters with a content of approx. 10 – 20% acetyl, cellulose esters with viscosities in the range of about 15 – 30 seconds are preferred. These viscosities are measured according to the ASTM- method D-871-48in a 20% solution of the polymer in acetone at 25°C. It is claimed as a particular advantage of these solvent-free protective agents, that owing to their particular physical characteristics they can readily be applied by hot-spraying.

From German Specification (Offenlegungsschrift) 2,030,429 meltable coatings for foodstuffs and pharmaceutical products on the basis of glycerides are also known, which give low viscosities in melted condition; these glycerides have at least the acetyl or the propionate group and at least one alkanoyl group with 16 – 24 carbon atoms.

The known melt coatings in many respects no longer meet the high demands made by today's buyer with regard to appearance and keeping quality of coated meat goods. It need only be mentioned that the appearance of many protective coatings, merely to be described as transparent, leaves much to be desired, together with the fact that the known protective coatings prevent any olfactory perception.

It has now been found that coatings with surprising characteristics can be produced on meat goods by dipping into a solution comprising 20 to 50 parts by weight of a high viscosity cellulose propionate with a viscosity (20% in acetone, measured in seconds according to ASTM D 871-56, formula B) of 15 to 95 poise, 80 to 50 parts by weight of a fully acetylated, distilled monoglyceride with a high iodine value (i.e., an iodine value from about 40 to 70, or higher), and, related to the propionate, 2.5 to 4.5 times the amount of an organic solvent.

In accordance with a further development of the invention, the solution may also contain 51 to 75 parts by weight of the cellulose propionate and 49 to 25 parts by weight of the monoglyceride.

If the cellulose propionate has a viscosity of 15 to 50 poise, the solvent, related to the propionate, is present preferably in 2.5 to 3.5 times the amount.

If the cellulose propionate has a viscosity of 50 to 95 poise, the solvent, related to the propionate, is present preferably in 3.5 to 4.5 times the amount.

The cellulose propionate of the aforementioned viscosity which is commercially available is a white, finely grained powder of the following parameters:

| | |
|---|---|
| acetyl content | approx. 3.6% |
| acetyl content, calculated as acetic acid | approx. 5.0% |
| butyryl content | approx. — |
| butyryl content, calculated as butyric acid | approx. — |
| propionyl content | 44.8% |
| propionyl content calculated as propionic acid | approx. 58.0% |
| hydroxyl content | 1.75% |
| density at 20°C | approx. 1.22 |
| bulk weight | approx. 300 g/l |
| bulk volume | approx. 3.3 l/kg |
| thermal stability | approx. 220°C |
| melting range | approx. 200 to 220°C. |

This propionate is soluble in many organic solvents, for example, in acetone, methylethylketone, methyl acetate, ethyl acetate, butyl acetate, methyl glycol and ethyl glycol.

In the following will be given some examples of distilled, completely acetylated monoglycerides with a high iodine value which are particularly useful for the purposes of the invention. Distilled, fully acetylated monoglycerides, were obtained from best quality lard, with the following parameters.

Physical characteristics:

| | |
|---|---|
| Appearance | clear, almost colourless, liquid |
| solidification point | at approx. +8°C |
| refractive index | 1447(40°C) |
| | 1443(50°C) |
| viscosity at +20°C | 50 cps |
| at +50°C | 19 cps |
| spec. gravity | |
| at +20°C | 0.99 |
| at +50°C | 0.96 |

Chemical characteristics:

| | |
|---|---|
| iodine value | 42 |
| saponification value | 380 |
| un- and partially acetylated % monoglyceride | 0–2 |
| Reichert-Meissel number | 145 |
| acid value | less than 4 |
| peroxide value | less than 2 |

Distilled, fully acetylated monoglyceride was obtained from partially hydrogenated vegetable oil with the following parameters:

Physical characteristics:

| | |
|---|---|
| appearance | clear, almost colourless liquid |
| solidification point | approx. 7°C |
| refractive index | 1447(40°C) |
| viscosity at +20°C | 56 cps |
| at +50°C | 19 cps |
| spec. gravity | |
| at +20°C | 0.98 |
| at +50°C | 0.96 |

Chemical characteristics:

| | |
|---|---|
| iodine value | 44 |
| saponification value | 380 |
| un- and partially acetylated % monoglyceride | 0–2 |
| Reichert-Meissel number | 146 |
| acid value | less than 4 |

Distilled, fully acetylated monoglyceride was obtained from cotton seed oil with the following parameters:

Physical characteristics:

| | |
|---|---|
| appearance | clear, very slightly yellow coloured liquid |
| solidification point | at about +1°C |
| refractive index | 1451(40°C) |
| viscosity at +20°C | 47 cps |
| at +50°C | 18 cps |
| spec. gravity | |
| at +20°C | 0.98 |
| at +50°C | 0.96 |

Chemical characteristics:

| | |
|---|---|
| iodine value | 70 |
| saponification value | 380 |

-continued

| Physical characteristics: | |
|---|---|
| un- and partially acetylated % monoglyceride | 0–2 |
| Reichert-Meissel number | 145 |
| acid value | less than 4 |

The distilled, fully acetylated monoglycerides with a high iodine value may for the purposes of the invention also be used as a mixture, the monoglyceride recovered from lard being the preferred compound.

Among the solvents which are possible for the purposes of the invention acetone is preferred because it completely evaporates, so that not a trace of smell remains behind.

EXAMPLE

As an example of a solution the following composition is given:
16 parts by weight of cellulose propionate with a viscosity of 53 poise for a 20% solution in acetone,
24 parts by weight of fully acetylated monoglyceride with a high iodine value from lard,
64 parts by weight of acetone.

In view of the multitude of fundamentally differing kinds of meat and sausage goods it is impossible from the start to give examples for all such goods, and this is hardly necessary, since it cannot be difficult for the meat expert to determine by manual tests the solution with the optimum composition for each particular kind of meat. The dipping into the solution for the coating of the meat goods takes place at room temperature in the well-known manner.

Solutions with the aforementioned higher content of 51 to 75 parts by weight of the cellulose propionate and the lower content of 49 to 25 parts by weight of the monoglyceride are recommended in particular for the coating of meat goods which are stored at low temperatures.

The coatings obtained are glass-clear, extremely thin, and they can easily be removed again from the meat goods. Moreover they have the remarkable characteristic of having a limited permeability for water vapour. Furthermore the coatings in accordance with the invention do not prevent the penetration of olfactory matter so that the buyer can evaluate the goods, as he is accustomed to, not only with the eyes but also with the nose; the buyer is thus in a position to examine the meat goods for their natural consistency.

The coatings moreover permit a molecular gas exchange, by means of which the pH-value of the meat is stabilized, which in turn is decisive with regard to the keeping properties of the meat goods. The coatings resist boiling up to about +100°C and low temperatures down to about −40°C without any detrimental effect upon the meat goods; the coatings are exceptionally shock and impact-proof which is important in particular for the transport and the non-expert handling of the meat goods by unskilled personnel. The coatings ward off photons or reduce their effect and also protect the meat goods from microbic contamination and against oxidation, so that the natural colour of the meat is preserved.

Thus the following advantages can be obtained with the coatings: prolonged maintaining of a biologically perfect condition of the wrapped meat goods, in particular with regard to their freshness, colour, aroma (relative enhancement of the aroma) and stabilization of the pH-range desired for the maturing of the meat; with the help of the stabilization a considerable prolongation of the optimum effectivenesss of the inherent enzymes of the meat is achieved to attain maximum tenderness and chewability without chewing residues.

The total bacterial-counts and the pH value of an untreated piece of meat and of a piece of meat provided with a coating in accordance with the invention are determined by known methods. The results of the tests are given in the following.

| | 1st Check: 7 days after slaughtering (4 days after preparation of the coating) | |
|---|---|---|
| | Control sample | coated piece of meat |
| pH value | 5.6 (edge and core) | 5.5 (edge and core) |
| bacterial count/g | $10^2$ (lactobacilli, yeasts) | $10^1$ (micrococci) |

| | 2nd check: 11 days after slaughtering (8 days after preparation of the coating) | |
|---|---|---|
| | control sample | coated piece of meat |
| pH value | 5.4 (edge and core) | 5.5 (edge and core) |
| bacterial count/g | $10^3$ (pseudomonads, aerobic spore producers, micrococci, lactobacilli) | $10^3$ (pseudomonads, aerobic spare producers, micrococci, lactobacilli) |

| | 3rd check: 13 days after slaughtering (10 days after preparation of the coating) | |
|---|---|---|
| pH value | 5.9 (edge) and 5.8 (core) | 5.6 (edge) and 5.5 (core) |
| bacterial count/g | $10^3$ (pseudomonads, aerobic spore producers, micrococci, lactobacilli) | $10^3$ (lactobacilli, aerobic spore producers) |

| | 4th check: 17 days after slaughtering (14 days after preparation of the coating) | |
|---|---|---|
| pH-value | 5.7 (edge and core) | 5.5 (edge and core) |
| bacterial count/g | $10^5$ (pseudomonads, aerobic spore producers, micro cocci, lactobacilli, yeasts) | $10^2$ (lactobacilli) |

| | 1st Check: 7 days after slaughtering (4 days after preparation of the coating) | |
|---|---|---|
| | Control sample | coated piece of meat |
| | 5th check: 20 days after slaughtering (17 days after preparation of the coating) | |
| pH-value | 5.7 (edge and core) | 5.6 (edge and core) |
| bacterial count/g | $10^5$ (pseudomonads, aerobic spore producers, micrococci, lactobacilli, yeasts) | $10^1$ (lactobacilli) |

The results of the experiments justify the assertion, that by virtue of a coating in accordance with the invention the pH remains practically constant and such a coating protects the meat goods from an attack by bacteria.

What we claim is:

1. A coating composition for meat and sausage goods comprising a solution containing about from 20 to 75 parts by weight of a high viscosity cellulose propionate having a viscosity of about from 15 to 95 poise, about from 80 to 25 parts by weight of a fully acetylated distilled monoglyceride having a high iodine value from about 40 to at least 70, and about from 2.5 to 4.5 parts by weight of an organic solvent per part of cellulose propionate present.

2. The composition in accordance with claim 1 wherein the solution contains about from 20 to 50 parts by weight of cellulose propionate and about from 80 to 50 parts by weight of monoglyceride.

3. The composition in accordance with claim 1 wherein the solution contains about from 51 to 75 parts by weight of cellulose propionate and about from 49 to 25 parts by weight of monoglyceride.

4. The composition in accordance with claim 1 wherein the cellulose propionate has a viscosity of about from 50 to 95 poise and the composition containing from about 3.5 to 4.5 parts organic solvent per part of cellulose propionate.

5. The composition in accordance with claim 1 wherein the fully acetylated distilled monoglyceride is a monoglyceride of lard fatty acids.

6. The composition in accordance with claim 1 wherein the fully acetylated distilled monoglyceride is a monoglyceride of partially hydrogenated vegetable oil.

7. The composition in accordance with claim 1 wherein the fully acetylated distilled monoglyceride is the monoglyceride of cottonseed fatty acids.

8. The composition in accordance with claim 2 wherein the fully acetylated distilled monoglyceride is a monoglyceride of lard fatty acids.

9. The composition in accordance with claim 2 wherein the fully acetylated distilled monoglyceride is the monoglyceride of partially hydrogenated vegetable oil.

10. The composition in accordance with claim 2 wherein the fully acetylated distilled monoglyceride is the monoglyceride of cottonseed oil fatty acids.

11. The composition in accordance with claim 3 wherein the fully acetylated distilled monoglyceride is the monoglyceride of lard fatty acids.

12. The composition in accordance with claim 3 wherein the fully acetylated distilled monoglyceride is the monoglyceride of partially hydrogenated vegetable oil.

13. The composition in accordance with claim 3 wherein the fully acetylated distilled monoglyceride is the monoglyceride of cottonseed oil fatty acids.

14. A process for preserving meat or sausage goods which comprises applying to said meat or sausage goods a coating composition containing about from 20 to 75 parts by weight of a high viscosity cellulose propionate having a viscosity of about from 15 to 95 poise and from about 80 to 25 parts by weight of a high iodine number, distilled, fully acetylated monoglyceride of a fatty acid having from 14 to 18 carbon atoms, said monoglyceride having an iodine number from about 40 to at least 70.

15. The process in accordance with claim 14 wherein the coating composition applied contains about from 20 to 50 parts by weight of the high viscosity cellulose propionate and about from 80 to 50 parts by weight of the monoglyceride.

16. The process in accordance with claim 14 wherein the coating composition applied contains about from 51 to 75 parts by weight of cellulose propionate and about 49 to 25 parts by weight of the monoglyceride.

17. The process in accordance with claim 14 wherein the monoglyceride is the monoglyceride of lard fatty acids.

18. The process in accordance with claim 14 wherein the monoglyceride is derived from partially hydrogenated vegetable oil fatty acids.

19. The process in accordance with claim 14 wherein the monoglyceride is derived from cottonseed oil fatty acids.

* * * * *